United States Patent [19]

Kasahara

[11] Patent Number: 5,710,937
[45] Date of Patent: Jan. 20, 1998

[54] SORTING APPARATUS

[75] Inventor: Yasunori Kasahara, Kamakura, Japan

[73] Assignee: Mitsubishi Denki Kabushiki Kaisha, Tokyo, Japan

[21] Appl. No.: 517,987

[22] Filed: Aug. 22, 1995

Related U.S. Application Data

[63] Continuation of Ser. No. 190,272, Feb. 2, 1994, abandoned.

[30] Foreign Application Priority Data

Feb. 15, 1993 [JP] Japan .................................. 5-025330

[51] Int. Cl.$^6$ .................................................. G06F 15/40
[52] U.S. Cl. .......................... 395/800; 395/600; 395/375; 364/222.9; 364/231.8; 364/282.1; 364/DIG. 1
[58] Field of Search .................................. 395/600, 800, 395/375; 364/222.9, 231.8, 282.1, DIG. 1

[56] References Cited

U.S. PATENT DOCUMENTS

| | | | |
|---|---|---|---|
| 4,245,306 | 1/1981 | Besemer et al. | 395/325 |
| 4,484,273 | 11/1984 | Stiffler et al. | 395/325 |
| 4,727,516 | 2/1988 | Yoshida et al. | 365/200 |
| 4,802,119 | 1/1989 | Heene et al. | 395/400 |
| 4,803,656 | 2/1989 | Takemae | 365/200 |
| 5,025,418 | 6/1991 | Asoh | 365/200 |
| 5,079,736 | 1/1992 | Kitsuregawa et al. | 395/600 |
| 5,084,815 | 1/1992 | Mazzario | 395/800 |
| 5,157,765 | 10/1992 | Birk et al. | 395/163 |
| 5,276,899 | 1/1994 | Neches | 395/800 |
| 5,410,689 | 4/1995 | Togo et al. | 395/600 |

FOREIGN PATENT DOCUMENTS

| | | |
|---|---|---|
| 0411788 | 2/1991 | European Pat. Off. . |
| 0516266 | 12/1992 | European Pat. Off. . |
| 0066061 | 12/1982 | Japan . |
| 2-129719 | 5/1990 | Japan . |
| 2-129727 | 5/1990 | Japan . |
| WO83/04116 | 11/1983 | WIPO . |

*Primary Examiner*—Alyssa H. Bowler
*Assistant Examiner*—John Harrity
*Attorney, Agent, or Firm*—Wolf, Greenfield & Sacks, P.C.

[57] ABSTRACT

A sorting apparatus is composed of sort processors connected in a pipeline fashion. Each sort processor 106 merge sorts data from the preceding sort processor and then outputs the merge sort result to the succeeding sort processor. The sort processor includes sort core portions and a front end internal storage and a back end internal storage for the respective sort core portions. Outside the sort processors, there are added external memories for the respective sort core portions. The front and back end internal storages and the external memories constitute a local memory. The sort core portions use, when a faulty area is found in the local memory, part of the front end and back end internal storages as an alternative memory.

10 Claims, 11 Drawing Sheets

SORTING APPARATUS

This application is a continuation of application Ser. No. 08/190,272, filed Feb. 2, 1994 now abandoned.

BACKGROUND OF THE INVENTION

1. Field of the Invention

This invention relates to an apparatus for sorting a large quantity of data at high speed, and more particularly to an apparatus for continuously sorting a large quantity of data with sort-dedicated processors connected in a pipeline fashion.

2. Description of the Related Art

A sorting apparatus is currently known in which a number of sort processors are connected in a pipeline fashion to sort a large quantity of data at high speed. In the conventional sorting apparatus shown in FIG. 9 of the accompanying drawings, a device in which two sort cores are contained in a package (i.e., doublestage sort processor) is used. An alternative device in which one sort core is contained in a single package (i.e., a singlestage processor) may be used for the same operation.

As shown in FIG. 9, firstly data to be sorted from an input/output path 1 is inputted in series. One item of data inputted to a sort processor 6 via the input/output path 1 is then stored in a front end internal storage 4 corresponding to a front end sort core portion 2 in the sort processor 6.

When another item of data is inputted from the input/output path 1, the front end sort core portion 2 merge-sorts one item of such newly inputted data and the data stored in the front end internal storage 4 as mentioned above, and outputs the sorted output string. Namely, this output string contains two items of data. Thus the front end sort core portion 2 outputs successively the sorted strings each containing two items of data. The storage situated at an each end is called a local memory.

The output string containing these two items of data is then supplied to the back end sort core portion 3. The back end sort core portion 3 stores the string, which is to be outputted from the front end sort core portion 2, firstly in the back end internal storage 5 corresponding to the back end sort core portion 3. When another output string is outputted from the front end sort core portion 2, the stored string and the new string inputted to the back end sort core portion 3 are merge-sorted, and an output string containing four items of (sorted) data is outputted.

Thus the back end sort core portion 3 merge-sorts two strings, i.e. those containing two items of data, which are to be outputted from the front sort core portion 2, and outputs successively an output string containing four items of data. As shown in FIG. 9, the back end internal storage 5 has a capacity two times larger than that of the front end internal storage 4. This is because the back end internal storage 5 is required to have a larger capacity in order that the back end sort core portion 3 can deal with longer strings, compared to the front end sort core portion 2.

FIG. 10 is a timing chart showing the access timing for the front end and back end internal storages (local memories) 4, 5 in the conventional sorting apparatus.

In either the front end or the back end sort core portion 2, 3, sorting by 2-way merging takes place so that the strings each containing two items of sorted data are outputted successively in the j-th front end (or back end) sort core portion 2 (or 3).

In the conventional art, two connected sort core portions, i.e. front end and back end sort core portions 2, 3, are stored in a single sort processor 6. A number of sort processors 6 are connected in series to form a pipeline. In FIG. 9, a nineteen-step pipeline is shown. In order to constitute the nineteen-step pipeline, as shown in FIG. 8, 9 and 11, ten sort processors are used, and the front end sort core portion 2 of the first sort processor 6 is not used.

According to the conventional arrangement of FIG. 9, on the back side of the back end sort core portion 3 of the fourth sort processor 6, external memories 7, 8, 9 are situated outside the sort processor 6 as local memories. This is because as merge-sort is repeated, the string will become progressively longer towards the last sort processor so that the front end and back end internal storage 4, 5 situated in the sort processor 6 will not suffice.

Generally, for the front end and back end internal storages 4, 5 in the sort processor 6, high speed SRAMs are often used. For the external memories 7, 8, 9, whose capacity is large, it is more usual to use DRAMs.

In FIG. 9, of the storage, the portion to be used as a local memory is indicated by hatching. Specifically, at the step in which the external memories 7, 8, 9 are to be used as a local memory, none of the front end or back end internal storages 4, 5 are used at all. This is because it is difficult to make addresses continuous between the internal and external memories.

In the conventional art of FIG. 9, ten sort processors 6 are used, and nineteen sort core portions are connected in a pipeline fashion. Therefore the result of sorting $2^{19}$ items of data can be obtained as the final output.

With this conventional arrangement, at the step in which the external memories are used as a local memory, none of the front end or back end internal storages 4, 5 are used. Also at the step in which only the front end and back end internal storages 4, 5 are used, the local memory requires a different capacity for every step so that an unused portion will inevitably be created.

As shown in FIG. 9, for example, in the first sort processor 6-1 including the first and second sort core portions 2, 3, such an unused portion is larger than in the second sort processor 6-2 including the third and fourth sort core portions 2, 3. This problem can be avoided by using a dedicated processor for every step, but it would result in a massive increase in production costs.

In the conventional sorting apparatus, since all the sort processors constitute a pipeline, operations at the individual steps must take place in synchronism. Consequently, it has been customary to supply a common clock signal to the sort core portions at the individual steps; this clock signal must be set so as to be usable by the lowest speed component in the system. In this conventional art, since the step in which DRAM situated outside as a local memory is used will become slowest, the entire operating speed will be adjusted to the operating speed at the stage whose local memory's access speed is the slowest. This is because generally an external DRAM has a slower access speed than the internal SRAM.

Further, when a fault occurs in a local memory, it is necessary to stop operation of the sorting apparatus and to specify the location of the fault, whereupon the faulty part must be changed with a new one. As a result, it used to take rather a long time for the apparatus to recover from the faulty condition.

SUMMARY OF THE INVENTION

With foregoing problems in mind, the objective of this invention is to provide a sorting apparatus which enables downsizing.

Another objective of the invention is to provide a sorting apparatus which enables high speed operation.

Still another objective of the invention is to provide a sorting apparatus which can improve RAS for the entire apparatus.

According to the first aspect of the invention, there is provided a sorting apparatus equipped with a number of sort processors connected in a pipeline fashion, wherein each of the sort processors comprises: a local memory for storing the first output string, which is to be outputted from the preceding sort processor, as the first data string; a sort core unit for merge-sorting the second output string, which is to be outputted from the preceding sort processor next to the first output string, and the first data string stored in the local memory and for outputting the result of sorting by merging to the succeeding sort processor; and the sort core unit in operation, when a faulty area is detected in the local memory, to use as an alternative memory of an area in which the first output string in the local memory is not stored.

With the first arrangement of the invention, since the unused area of the local memory can be used as an alternative memory of the faulty part, it is not necessary to change the faulty part with a new one and it is possible to continue the operation.

Therefore, since the unused portion of the local memory is used when a fault is found in the local memory, it is possible to continue sorting without removing the faulty part. As a result, an improved rate of operation can be achieved.

According to the second aspect of the invention, there is provided a sorting apparatus equipped with a number of sort processors, wherein each of the sort processors comprises: a local memory for storing the first output string, which is to be outputted from the preceding sort processor, as the first data string, the local memory including a low speed portion whose access speed is slow, and a high speed portion whose access speed is fast; a sort core unit for merge sorting the second output string, which is to be outputted from the preceding sort processor next to the first output string, and the first data string stored in the local memory and for outputting the merge sort result to the succeeding sort processor; and the sorting core unit including transfer means for, when reading of the first data string from the high speed portion of the local memory is started, transferring data from the low speed portion to an address in the high speed portion from which the data has been read, and access adjusting means for, when data from the low speed portion is read, returning the data, which is transferred by the transfer means, to the sort core unit at high speed.

With the second arrangement of the invention, since the high speed portion of the local memory acts as a buffer storage for the low speed portion, it is possible to improve the access speed to the low speed portion remarkably.

Thus since the high speed portion is used as a high speed buffer storage, it is possible to reduce the access time to the low speed portion whose access time is long. As a result, it is possible to realize a sorting apparatus which is inexpensive to manufacture and enables improved performance.

According to the third aspect of the invention, there is provided a sorting apparatus equipped with a number of sort processors connected in a pipeline fashion, and a number of external local memories, one for each of the sort processors, for storing the first output string, which is to be outputted from the preceding sort processor, as the first data string, wherein each of the sort processors includes a sort core unit for merge-sorting the second output string, which is to be outputted from the preceding sort processor next to the first output string, and the first data string stored in the local memory and for outputting the merge-sort result to the succeeding sort processor, and wherein two or more of the external local memories are situated in a common memory which is shared by a number of the sort processors.

With the third arrangement of the invention, since the common memory is shared by the plural sort processors, it is possible to reduce the unused portions so that efficient use of the local memory can be achieved.

Thus since the local memory is shared by the plural sort processors, it is possible to reduce the unused portions of the local memory. As a result, it is possible to improve the efficiency of use of memories so that a compact-size apparatus can be realized.

DETAILED DESCRIPTION

Several preferred embodiments of this invention will now be described with reference to the accompanying drawings.

Embodiment 1

Figure 1:
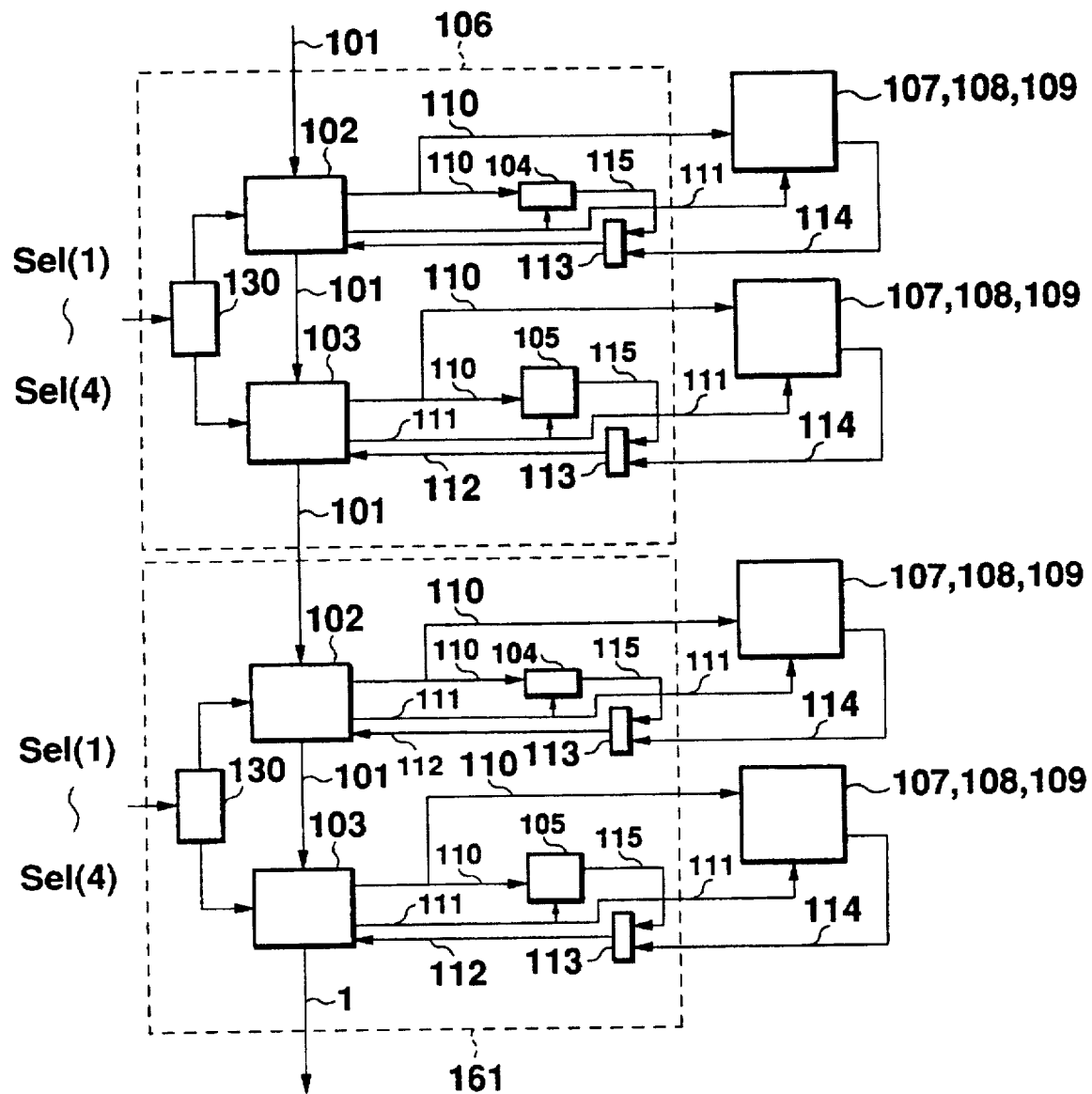
FIG. 1 is a fragmentary block diagram showing a sorting apparatus according to the first embodiment of this invention.

FIG. 1 is a block diagram showing a sorting apparatus according to the first embodiment of this invention. A number of sort processors 106 constituting the sorting apparatus of this embodiment each include, as shown in FIG. 1, a front end sort core portion 102, a back end sort core portion 103, and a decoder 130 for designating a memory, which is to be used as a local memory, for the front end and back end sort core portions 102, 103. The decoder 130 supplies an access switching bit to the front end and back end sort core portions 102, 103 to designate front end and back end internal storages 104, 105 or external memories 107, 108, 109 to be used.

The decoder 130 designates the access switching bit according to a selection signal (1)-(4) from an external source.

This embodiment is characterized in that the access switching bit for changeover between the front end and back end internal storages 104, 105 and the external memories 107, 108, 109 is designated by the decoder 130. Accordingly it is possible to designate from outside so that access will be made to the internal storages if the switching bit is "0" and to the external memories if the switching bit is "1". It is therefore possible to make access to the front end and back end internal storages 104, 105 and external memories 107, 108, 109 successively.

Figure 2:
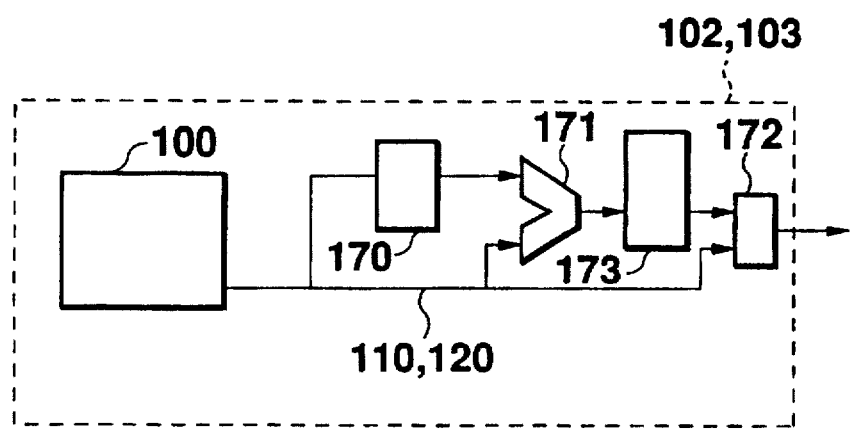
FIG. 2 is a detailed view showing a sort core unit of FIG. 1.

FIG. 2 is a detailed block diagram showing the front end and back end sort core portions 102, 103 of FIG. 1. As shown in FIG. 2, each of the front end and back end sort core portions 102, 103 includes a local memory address generating block 100. Each sort core portion 102, 103 also includes an error address register 170, a comparator 171, a 2-to-1 selector 172, and an address translator 173.

The operation of the sorting apparatus will now be described.

The sorting apparatus of the first embodiment is designed so as to make a self-diagnosis by a diagnostic program at the start of the system. In the diagnostic program at the start of the system or in the memory read cycle during the actual operation, if an ECC (Error Correction Code) 2-bit error is detected, an unable-to-continue-sort-operation error will be reported to a host unit, which is a sorter drive unit serving as an interface between a host computer and the sorting apparatus.

Figure 3:
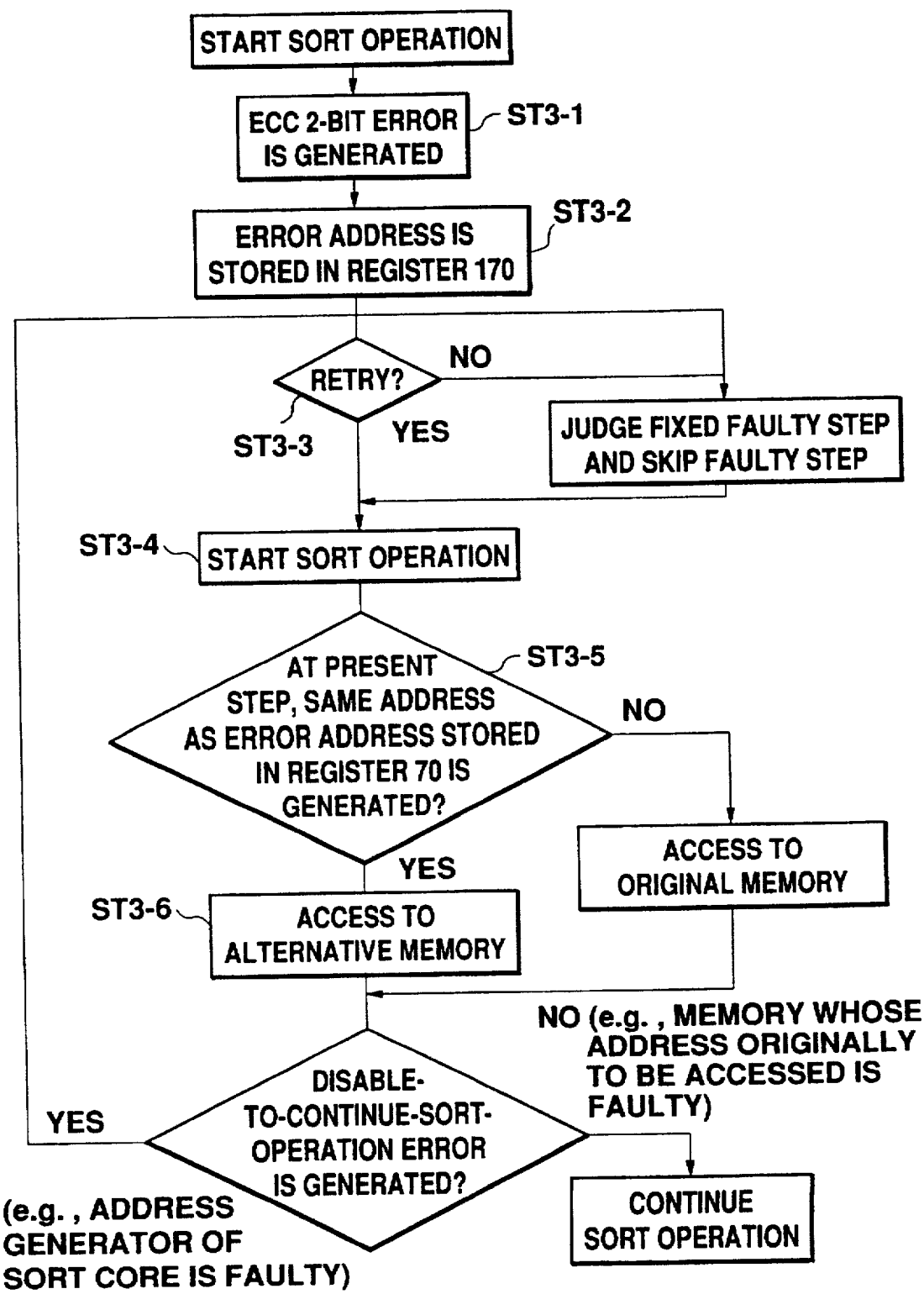
FIG. 3 is a flow diagram showing the error recovery procedure of the sorting apparatus of the first embodiment.

FIG. 3 is a flow diagram showing such an error recovery procedure. As shown in FIG. 3, when this unable-to-continue-sort-operation error is reported, the host unit issues a temporary stop signal for every step of the sorting apparatus to store in an error address register 170 an address at which the error has occurred (step ST3-2).

If an ECC error occurs once again at the same address stored in the error address register while 'retry' is set, namely, while 'yes' is selected at step ST3-3 (if 'yes' is selected at step ST3-5), the comparator 171 detects this. At that time, the address translator 173 of FIG. 2 designates empty areas of the front end and back end storages 104, 105 according to a detection signal outputted from the comparator 171. In other words, the empty areas are used as an alternative memory (step ST3-6). Thus an address signal designating the empty areas will be outputted via the selector 172.

If no coincidence is found by the comparator 171 (if 'no' is selected at step ST3-5), an address signal will be outputted from address buses 110, 120 via the selector 172.

If the address to be stored in the error address register 170 is to be processed by an error recovery system, it will be held until a reset signal is inputted. The comparison of the comparator 172 will be executed at every memory access after retry. If coincidence is found as a result of the comparison, the address translator 173 will output an address signal to the front end and back end internal storages 104, 105.

According to the first embodiment, since the unused portions in the front end and back end internal storages 104, 105 are used as an alternative memory, it is not necessary to change any part with a new one, during which the apparatus must be stopped, even when a faulty portion is found in the external local memory.

Embodiment 2

Figure 4:
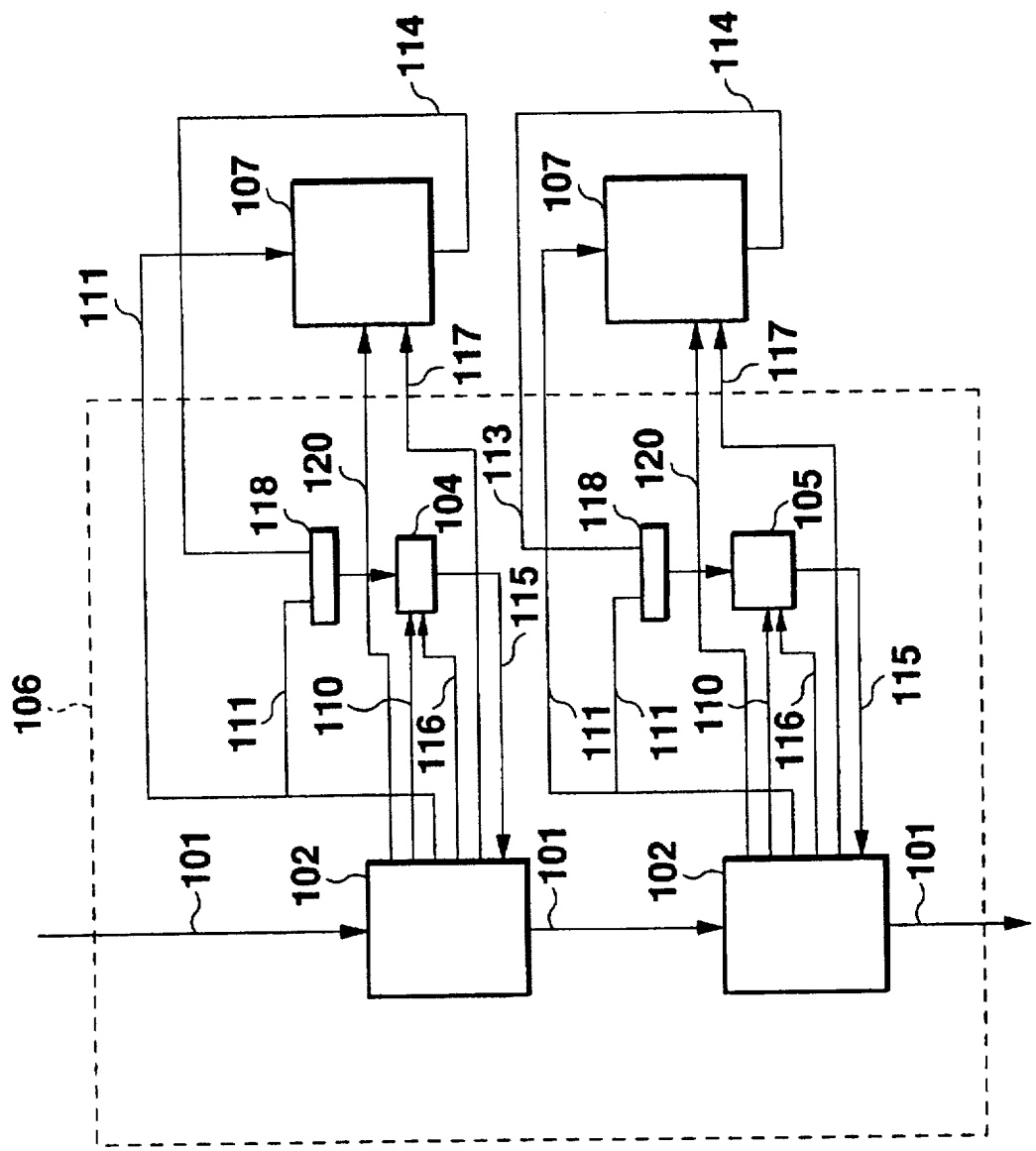
FIG. 4 is a block diagram showing one of the sort processors to be used in a sorting apparatus according to the second element.

FIG. 4 is a block diagram showing one of the sort processors 106 used in a sorting apparatus according to the second embodiment. As shown in FIG. 4, according to the sort processor 106 of the second embodiment, switching signals outputted from the sort core portion 102 as local memory address signals are supplied to the front end internal storage 104 via an internal bus 110 and to the external memory via an external bus 120, respectively.

The data read from the front end internal storage 104 is inputted to the front end sort core portion 102 via an internal read bus 115. In this embodiment, for data writing, a block pointer, which indicates the next address, is stored in the local memory together with the data.

A feature of this embodiment is that the front and back end internal storages 104, 105 are used as a high-speed buffer storage.

In merge sort, addresses are continuously accessed. Therefore, the data stored in the external memory 107 can be read after it has been read from the front end or back end internal storage 104, 105. In this embodiment, with a view to this point, every time data is read from the front end internal storage 104, data from the external memory 107 will be transferred to the front internal storage 104. When access is made to the external memory 107, the data transferred to the front end internal storage 104 will be read.

Figure 5:
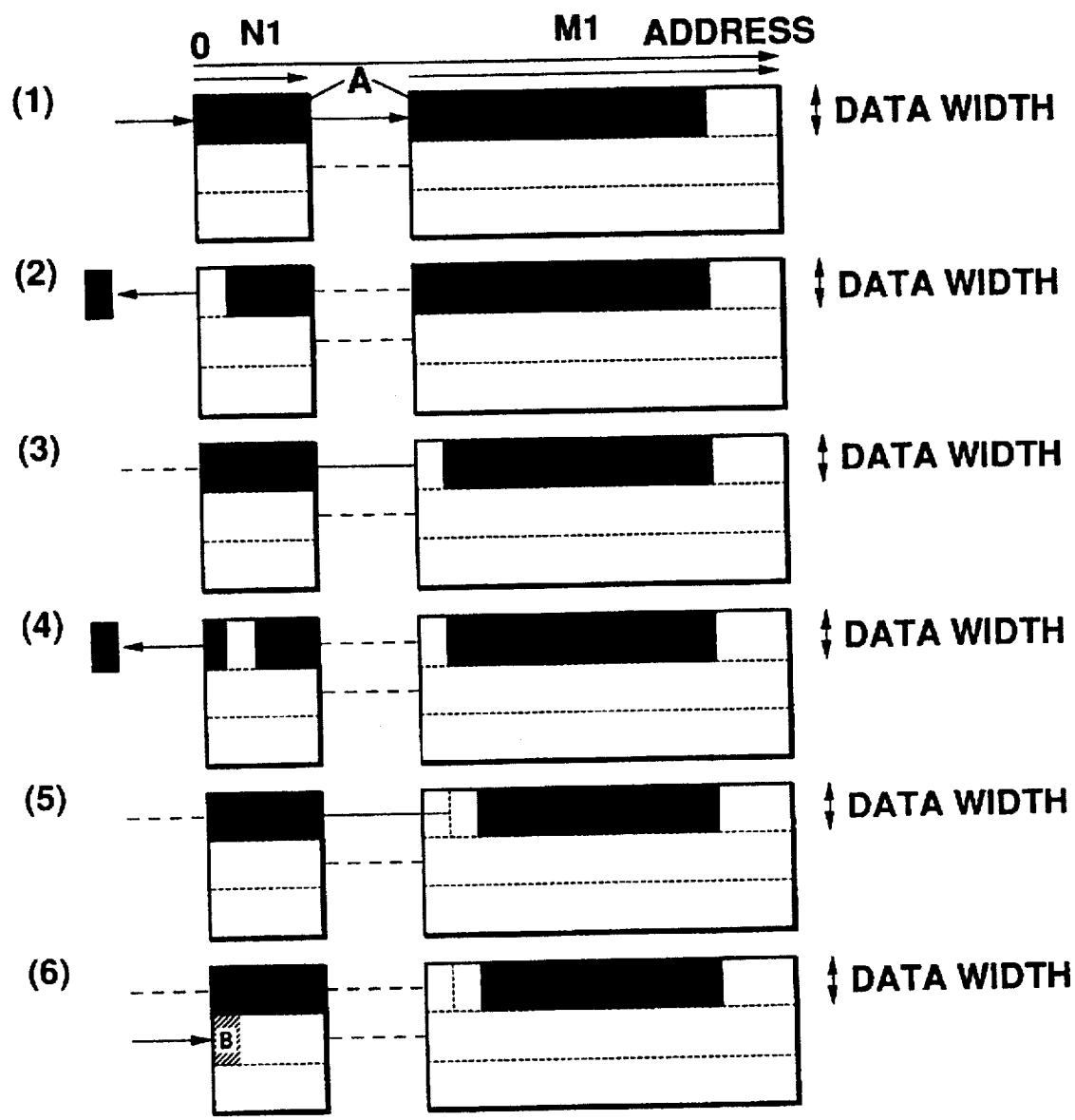
FIG. 5 is a diagram showing the data transfer between an internal storage and an external memory in the sorting apparatus of FIG. 4.

FIG. 5 is a diagram showing the access timing in the case where the front end internal storage 104 is used as a high-speed buffer storage. In FIG. 5, the boxes shown on the left side indicate the front end internal storages 104 serving as high-speed buffer storages, while the boxes shown on the right side indicate the external memories 107.

The operation of the sorting apparatus of the second embodiment will now be described in detail.

FIG. 5 shows the block transfer of data between the front end internal storage 104 and the external memory 107 as mentioned above. In the example of operation shown in FIG. 5, a string A is stored in the external memory 107, and it will then be read before the next string B is stored there. In FIG. 5, time lapses vertically, i.e., from (1) toward (6).

At (2) of FIG. 5, the front end or back end sort core portion 102, 103 reads one block of data from the front end internal storage 104. Then at (3), one block of data is transferred from the external memory 107 to the front end internal storage 104. Since the block of data read at (2) will not read again, another block data read from the external memory 107 will be stored if one block of data has been read from the front end internal storage 104.

Figure 6:
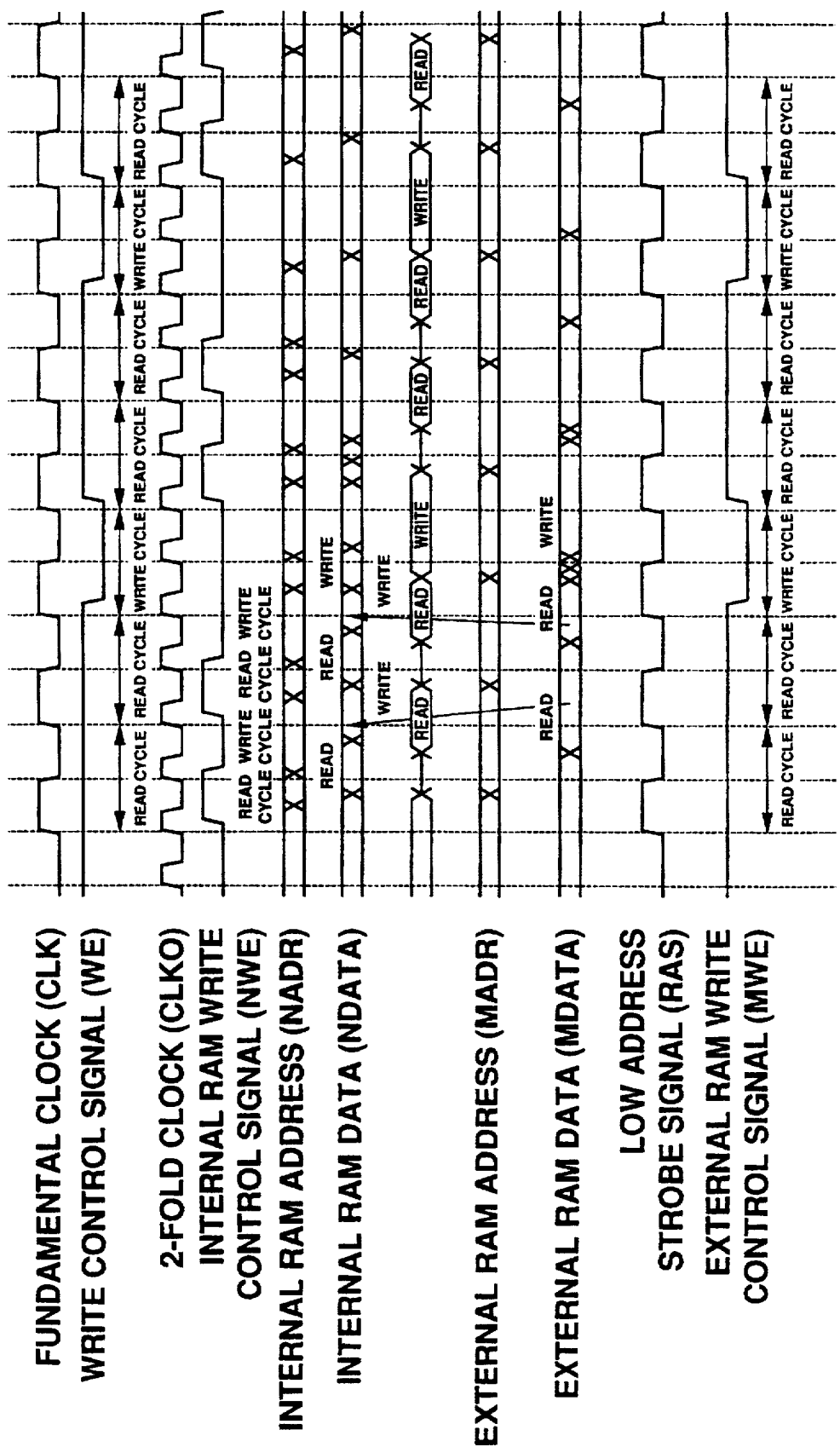
FIG. 6 is a timing diagram showing the operation of the sorting apparatus of FIG. 2.

According to this embodiment, in the sorting apparatus in which the high-speed front end internal storage 104 and the low-speed external memory 107 are used as local memories, it is possible to make the access time to the external memory 107 considerably short by previously transferring the data of the external memory 107 to the front end internal storage 104 every time the data is read from the external memory 107. FIG. 6 is a timing diagram showing the operation of the sorting apparatus of this embodiment.

In the second embodiment, either the front end internal storage 104 or the external memory is used as a local memory. Alternatively only the external memory 107 may be used as a local memory. Namely, in this alternative case, since the front end internal storage 104 is unused, not only effective use of hardware but also improved performance can be achieved by using the entire front end internal storage 104 as a high-speed buffer storage for the external memory 107.

Embodiment 3

Figure 7:
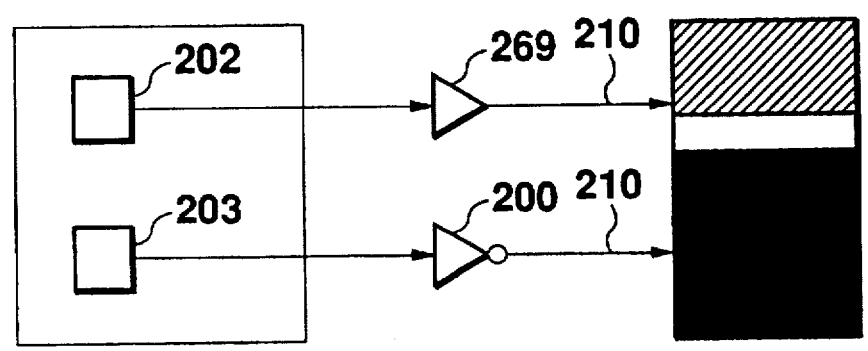
FIG. 7 is a diagram showing the manner of use of a local memory in a sorting apparatus according to the third embodiment.

FIG. 7 shows the manner of use of a local memory in a sorting apparatus of the third embodiment. In FIG. 7, an address signal from one of adjacent sort core portions will be outputted to the local memory via a buffer 269, while an address signal from the other sort core portion will be outputted to the same local memory via an inverter 200. As a result, although the same addresses may be outputted between the adjacent sort core portions 202, 208, these addresses would not overlap each other.

By allocating the access timing for the local memory shared by the adjacent sort core portions 202, 203 to the front and back halves of the fundamental clock, it is possible to shift the mutual access timings so that any access conflict can be prevented.

According to the third embodiment, it is possible for two sort core portions to share a single local memory. Therefore it is possible to reduce unused portions in the local memory.

Embodiment 4

Figure 8:
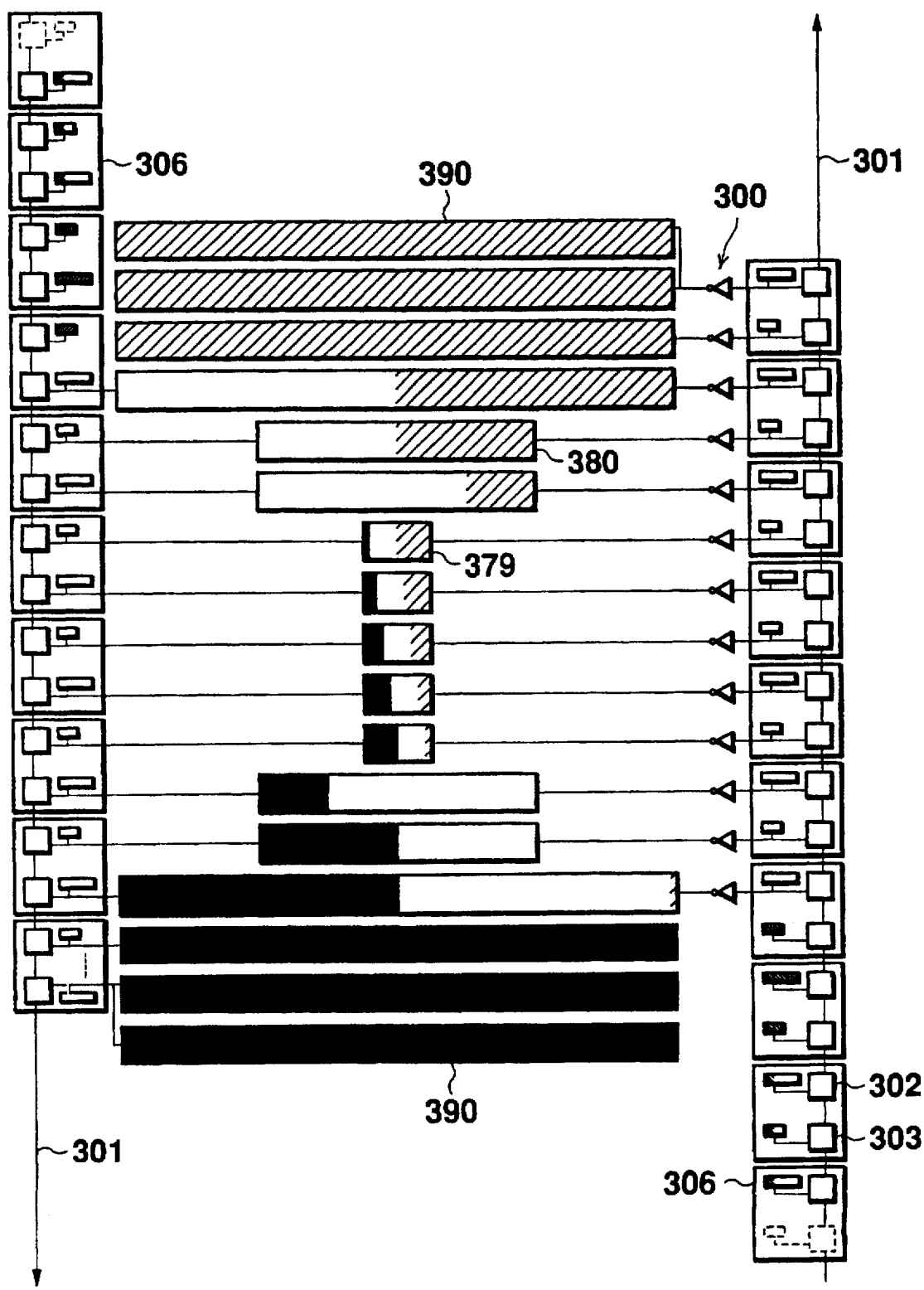
FIG. 8 is a block diagram showing a sorting apparatus according to the fourth embodiment.
Figure 9:
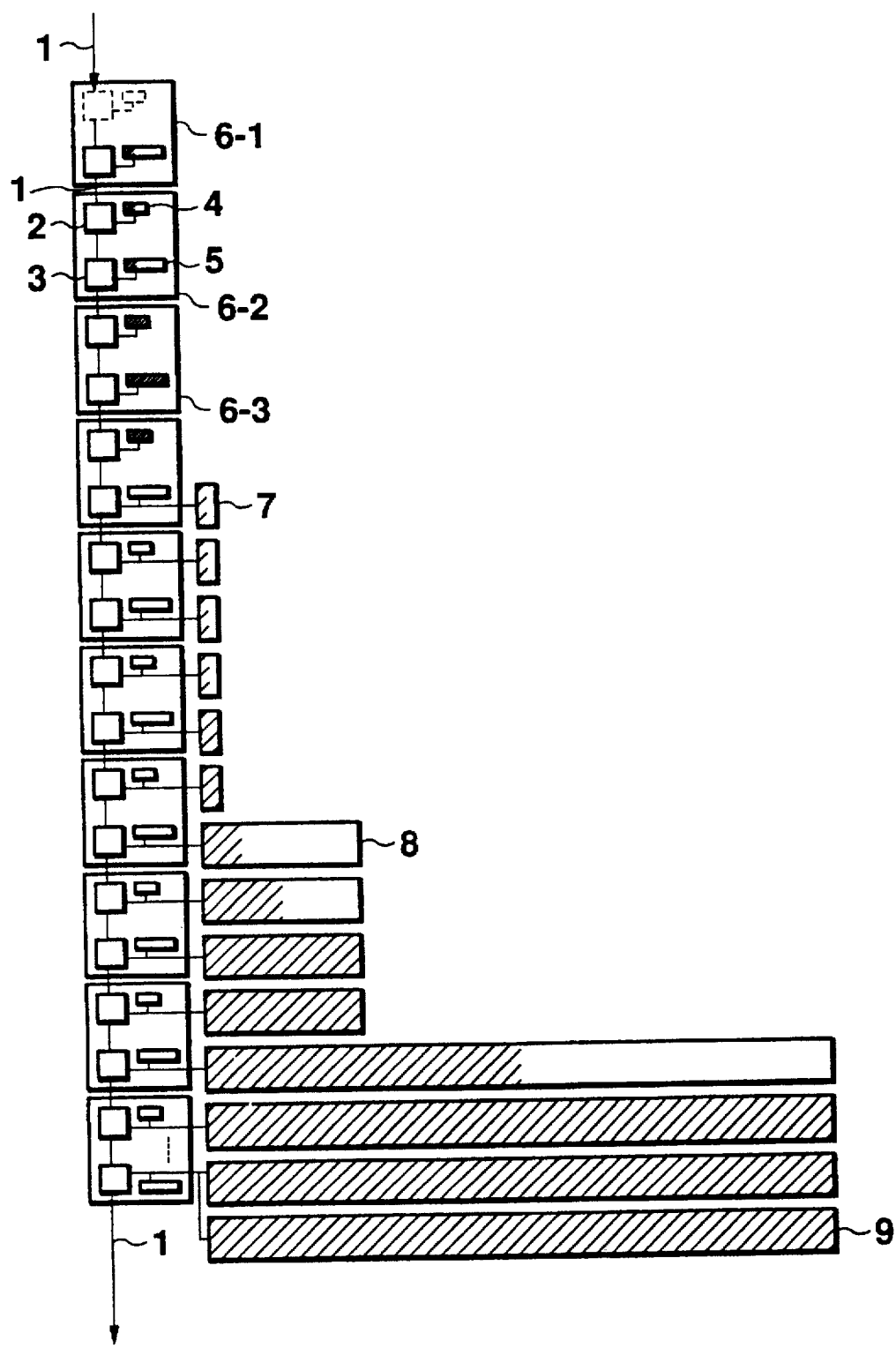
FIG. 9 is a block diagram showing a conventional sorting apparatus.

FIG. 8 is a block diagram showing a sorting apparatus according to the fourth embodiment. In a conventional structure, two sorting apparatuses are arranged in opposite directions. Whereas in the fourth embodiment, a single local memory is shared by two sorting apparatuses like the third embodiment. Specifically, in the third embodiment, a single local memory is shared by a number of sort core portions in one sorting apparatus. In the fourth embodiment, one local memory is shared by different sorting apparatuses.

Figure 10:
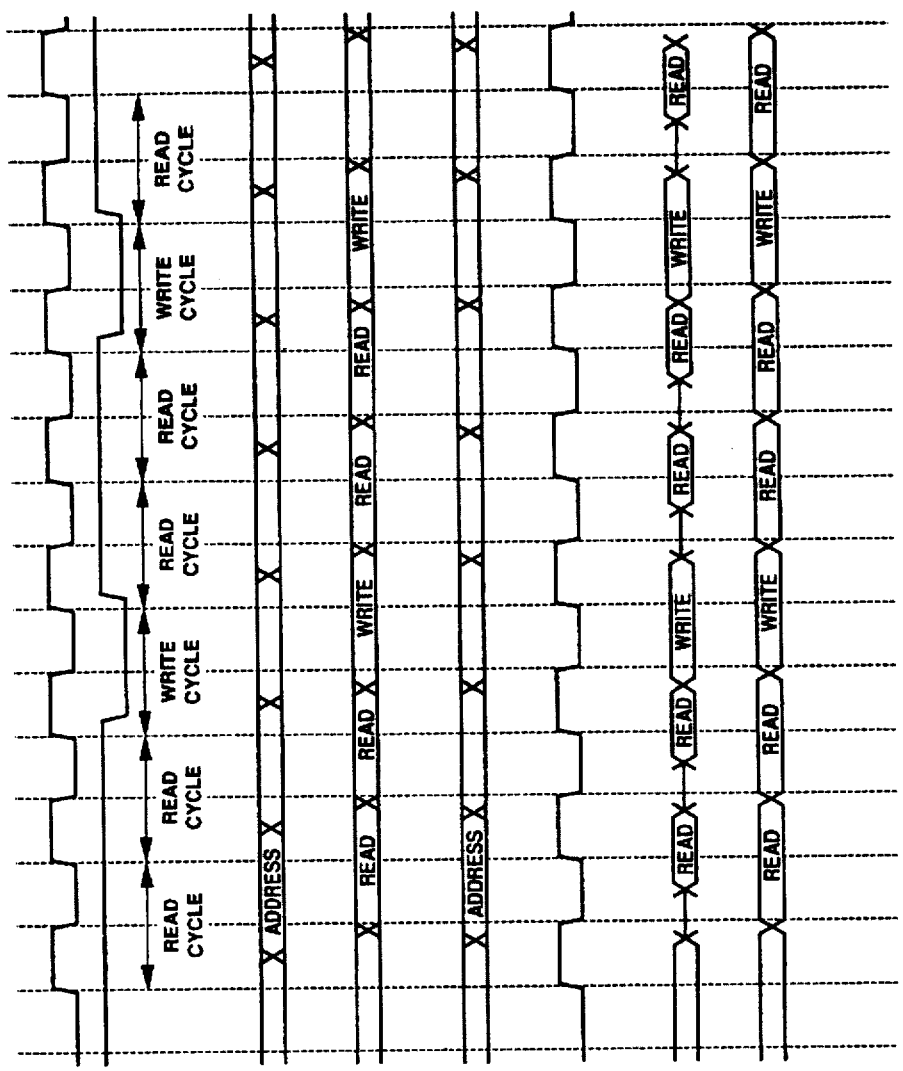
FIG. 10 is a timing diagram showing the memory access of the conventional sorting apparatus.
Figure 11:
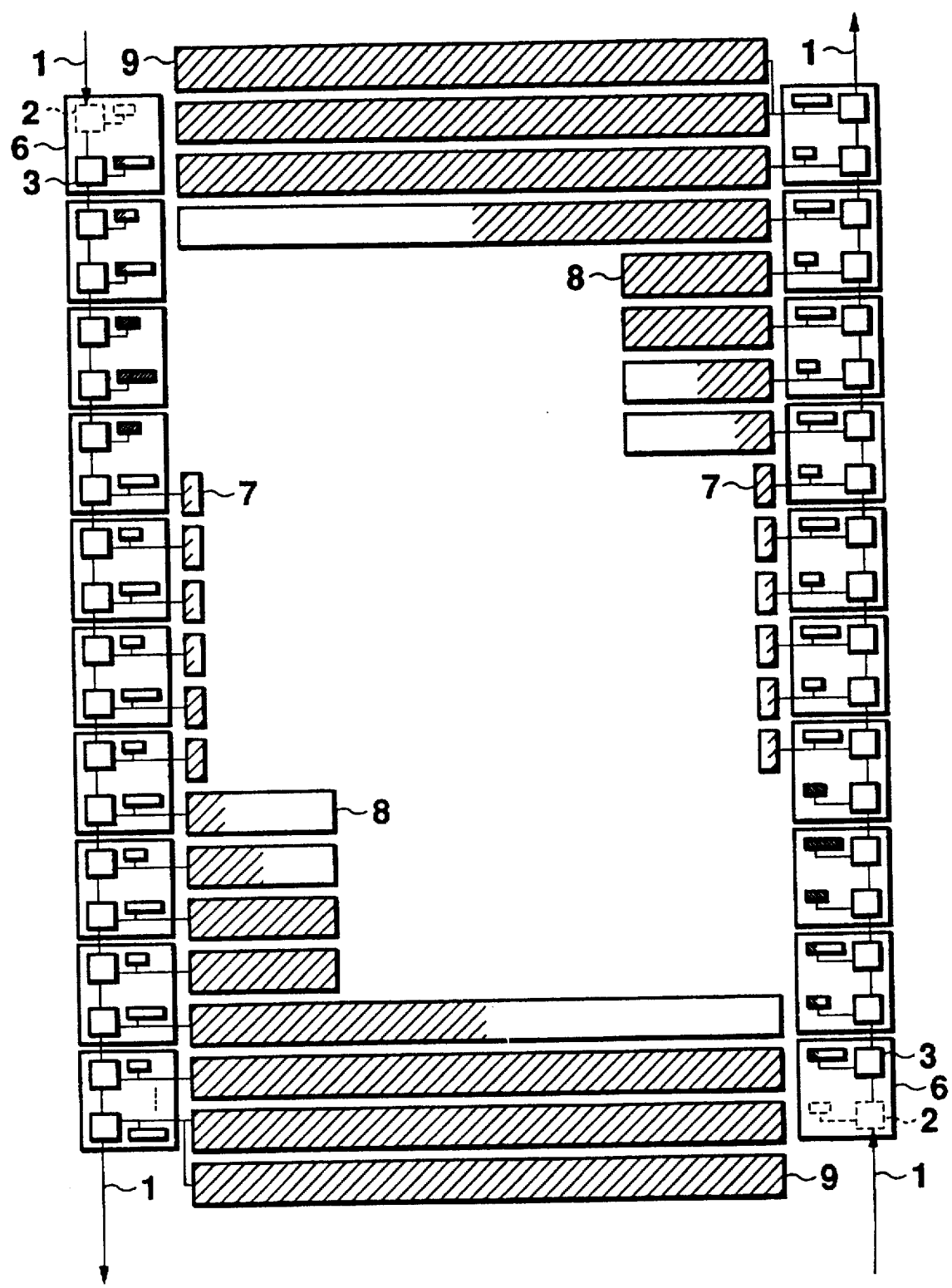
FIG. 11 is a block diagram showing another conventional double-sorter sorting apparatus.

As shown in FIG. 8, the address signals outputted from the sort core portions of one sorting apparatus will be supplied to the local memories 379, 380, 390 via inverters 300. These shared local memories 379, 380, 390 are memories whose access speed is more than twice as quick as the non-shared external memories 7, 8, 9 (FIG. 10.).

In this embodiment, since one local memory is shared by two sorting apparatuses, it is possible to reduce unused portions in the local memory so that the sorting apparatus can be manufactured at a reduced cost without impairing the performance.

What is claimed is:

1. A sorting apparatus comprising:
    a plurality of sort processors, wherein each of said sort processors includes
        (a) a local memory for storing a first output string, which is to be outputted from a preceding sort processor, as a first data string, said local memory including a low speed portion, and a high speed portion having an access speed quicker than an access speed of said low speed portion, a first portion of said first data string being stored in the high speed portion of the local memory and a second portion of said first data string being stored in the low speed portion of the local memory; and
        (b) a sort core unit for merge sorting a second output string, which is outputted from said preceding sort processor, and the first data string stored in said local memory and for outputting a merge sort result to a succeeding sort processor;
    wherein, to read said first data string from said local memory, said sort core unit includes control means for returning data of said first portion of said first data string from said high speed portion to said sort core unit, for transferring data of said second portion of said first data string from said low speed portion to an address in said high speed portion as data is returned from said high speed portion to said sort core unit, and for returning data of said second portion of said first data string from said high speed portion to said sort core unit at high speed.

2. A sorting apparatus comprising a plurality of sort processors connected in a pipe-line fashion, and a plurality of memories connected to said plurality of sort processors;
    wherein at least one said sort processors is connected to at least two of said plurality of memories and includes:
        means for receiving an external identification signal for identifying one of said at least two of said plurality of memories to be used in sorting,
        storing means for storing a first output string, which is outputted from a preceding sort processor, in said one of said at least two memories identified by said identification signal, as a first data string, and
        a sort core unit for merge sorting a second output string, which is outputted from said preceding sort processor and the first data string stored in said identified memory, and for outputting a merge sort result to a succeeding sort processor.

3. A sorting apparatus comprising:
    a plurality of sort processors connected in a pipe-lined fashion, and a plurality of external local memories corresponding to said plurality of sort processors, for storing a first output string, which is outputted from a preceding sort processor, as a first data string.
    wherein each of said plurality of sort processors includes a sort core unit for merge sorting a second output string, which is outputted from said preceding sort processor and the first data string stored in one of said external local memories corresponding to said sort processor, and
    wherein one of said external local memories is situated in a low portion of a common memory and another one of said external local memories is situated in a high portion of the common memory, and
    wherein a sort processor corresponding to the external local memory situated in the high portion of the common memory includes an inverter for inverting an address to be accessed prior to accessing said address in said common memory, so as to access said high portion of the common memory.

4. A sorting apparatus comprising:
    a plurality of sort processors connected in a pipe-lined fashion, and a plurality of external local memories corresponding to said plurality of sort processors, for storing a first output string, which is outputted from a preceding sort processor, as a first data string.
    wherein each of said plurality of sort processors includes a sort core unit for merge sorting a second output string, which is outputted from said preceding sort processor and the first data string stored in one of said external local memories corresponding to said sort processor,
    wherein one of said external local memories is situated in a first portion of a common memory and another one of said external local memories is situated in a second portion of the common memory, and
    wherein said plurality of sort processors are divided into a first group and a second group, the sort processors in each group being separately arranged in a pipeline manner to create two distinct sorting paths, and wherein a sort processor in said first group and a sort processor in said second group correspond to the external local memories situated in said common memory.

5. A sort processor for a sorting apparatus having a plurality of sort processors connected in pipeline-fashion, said sort processor comprising:
    (a) a local memory for storing a first output string, which is to be outputted from a preceding sort processor, as a first data string, said local memory including a low speed portion, and a high speed portion having an access speed quicker than an access speed of said low speed portion, a first portion of said first data string being stored in the high speed portion of the local memory and a second portion of said first data string being stored in the low speed portion of the local memory; and (b) a sort core unit for merge sorting a second output string, which is outputted from said preceding sort processor, and the first data string stored in said local memory and for outputting a merge sort result to a succeeding sort processor;

wherein, to read said first data string from said local memory, said sort core unit includes control means for returning data of said first portion of said first data string from said high speed portion to said sort core unit, for transferring data of said second portion of said first data string from said low speed portion to an address in said high speed portion as data is returned from said high speed portion to said sort core unit, and for returning data of said second portion of said first data string from said high speed portion to said sort core unit at high speed.

6. A sort processor for a sorting apparatus having a plurality of sort processors connected in pipeline-fashion, said sort processor comprising:

means for receiving an external identification signal for identifying one of said at least two of said plurality of memories to be used in sorting, storing means for storing a first output string, which is outputted from a preceding sort processor, in said one of said at least two memories identified by said identification signal, as a first data string, and a sort core unit for merge sorting a second output string, which is outputted from said preceding sort processor and the first data string stored in said identified memory, and for outputting a merge sort result to a succeeding sort processor.

7. A sorting apparatus comprising:

a first plurality of sort processors connected in a pipe-lined fashion to form a first sorting path;

a second plurality of sort processors, connected in a pipe-lined fashion to form a second sorting path;

wherein each of the sort processors of the first plurality of sort processors and the second plurality of sort processors includes:

(a) a local memory for storing a first output string, which is to be outputted from a preceding sort processor, as a first data string; and (b) a sort core unit for merge sorting a second output string, which is outputted from said preceding sort processor, and the first data string stored in said local memory and for outputting a merge sort result to a succeeding sort processor;

wherein one sort processor of said first plurality of sort processors requires additional memory of a first size for storing a corresponding first output string and one sort processor of said second plurality of sort processors requires additional memory of a second size for storing a corresponding first output string; and an external memory, having a size greater than said first size and said second size, connected to the one sort processor of the first plurality of sort processors to provide access to a first part of the external memory, and connected to the one sort processor of the second plurality of sort processors to provide access a second part of the external memory.

8. The sorting apparatus of claim 7, further comprising:

a plurality of external memories, each external memory being connected to one sort processor of the first plurality of sort processors to provide access to a first part of the external memory, and connected to one sort processor of the second plurality of sort processors to provide access a second part of the external memory.

9. The sorting apparatus of claim 7, further comprising address adjusting means, connected between the external memory and the one sort processor of the second plurality of sort processors, for adjusting an address from the sort processor to be within addresses in said second part of said external memory.

10. The sorting apparatus of claim 9, wherein said address adjusting means includes an inverter.

\* \* \* \* \*

UNITED STATES PATENT AND TRADEMARK OFFICE
CERTIFICATE OF CORRECTION

PATENT NO. : 5,710,937
DATED : January 20, 1998
INVENTOR(S) : Yasunori Kasahara

It is certified that error appears in the above-identified patent and that said Letters Patent is hereby corrected as shown below:

In FIG. 6 change "LOW ADDRESS" to -- ROW ADDRESS --.

In FIG. 10 change "LOW ADDRESS" to -- ROW ADDRESS --.

Column 6, line 39 change "not read again" to -- not be read again --.

Column 7, line 1 change "202, 208" to -- 202, 203 --.

Signed and Sealed this

Twenty-sixth Day of May, 1998

Attest:

BRUCE LEHMAN

*Attesting Officer*    *Commissioner of Patents and Trademarks*